UNITED STATES PATENT OFFICE.

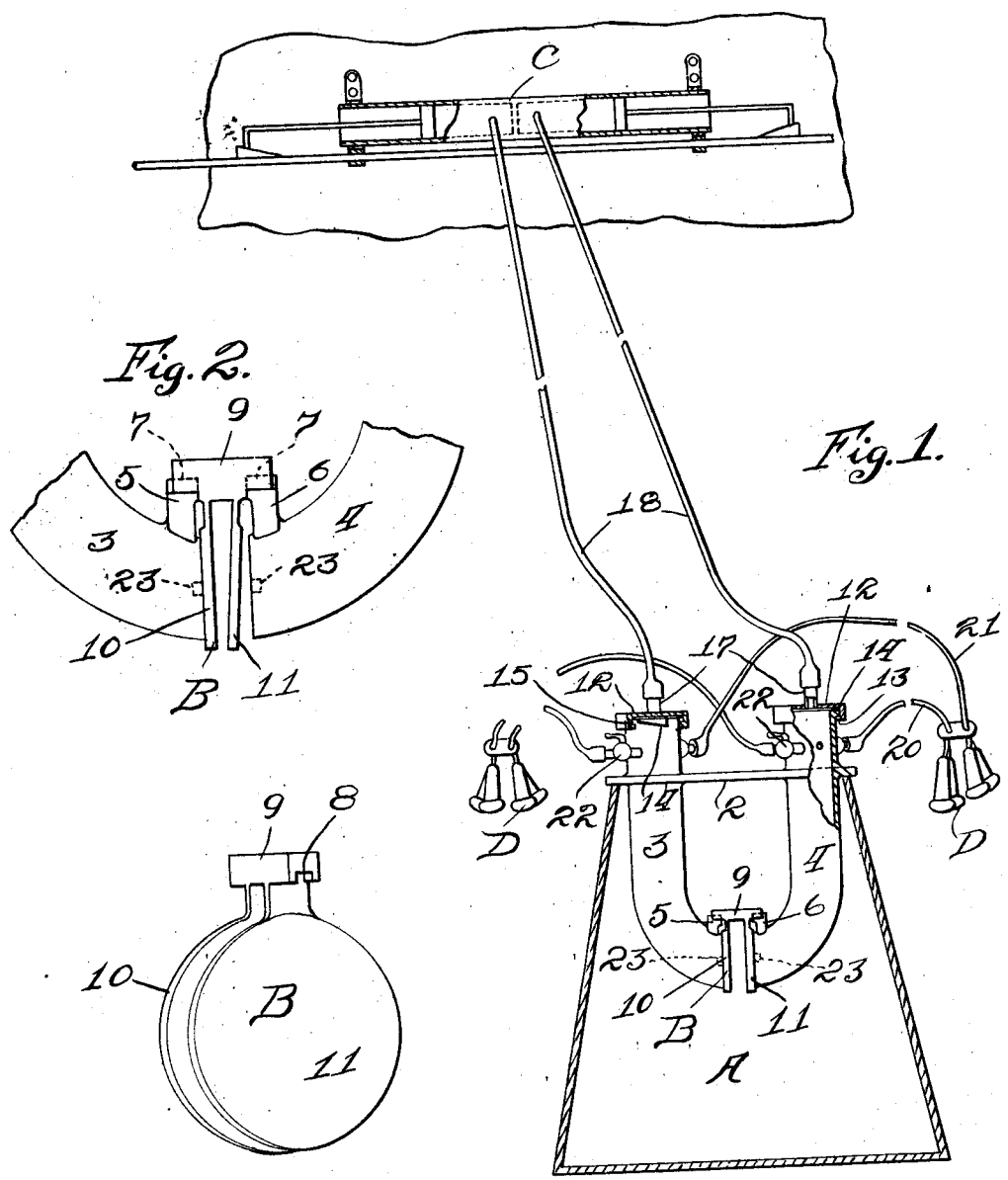

REUBEN B. DISBROW, OF ST. PAUL, MINNESOTA.

MILKING APPARATUS.

1,185,638.   Specification of Letters Patent.   Patented June 6, 1916.

Application filed September 23, 1915. Serial No. 52,192.

*To all whom it may concern:*

Be it known that I, REUBEN B. DISBROW, a citizen of the United States, residing at St. Paul, in the county of Ramsey and State of Minnesota, have invented a new and useful Improvement in Milking Apparatus, of which the following is a specification.

The primary object of this invention is the production of a simple and inexpensive apparatus for milking cows, and more particularly relates to the improved construction of the valve mechanism, whereby a sanitary device is produced, which can be easily and quickly cleaned and sterilized.

The parts of my invention enable dismantling, so that the joints can be thoroughly cleaned and the parts reassembled.

More particularly this invention has to do with that class of milking apparatus in which a pulsating action is produced by an air pipe system and my improved valve construction.

In the accompanying drawing forming part of this specification, Figure 1 is a vertical section of part of my invention, a detail of the pump and pipe system being shown; Fig. 2 is a side elevation of a detail, and Fig. 3 is a perspective of my improved valve.

In the drawing A indicates a milk receptacle, such as a pail which in use is placed on the ground or floor alongside of the cow to be milked. This pail is provided with a cover 2, which has mounted thereon a pair of oppositely disposed tubular milk containers 3 and 4. These milk containers are similar in construction, their bodies extending upwardly through the cover and their lower ends being curved inwardly and terminating a short distance apart. These ends lie substantially parallel and have formed on their upper sides a pair of lugs 5 and 6. These lugs are formed with a pair of protuberances 7 lying in substantial alinement which are adapted to enter a pair of grooves 8 in the yoke 9 of the valve B. The valve B depends from the yoke and takes the form of two parallel plates 10 and 11, which normally close the lower ends of the milk containers. The entire valve B is made out of rubber or other suitable flexible material, and when in position, the protuberances 7 enter the grooves 8 and maintain the yoke in stationary position with the valves in position to open and close by the action of air exhausted from one of the milk containers, while the pressure of milk in the opposite container urges the opposite valve open, permitting the milk to flow into the milk container A. Upon the upper end of each of the milk receptacles is a removable cap 12, which locks into connection with the milk receptacle by lugs 13 engaging below shoulders 14. Suitable grooves 15 are provided through which the lugs 13 may be passed into engagement with the shoulders 14 and the lower edges of the shoulders 14 are inclined, so that when the cap 12 is given a short turning movement, it is drawn tightly down upon the upper end of the milk receptacle and forms a tight joint. The top of the cap 12 is provided with a tube 17 over which flexible tubing such as 18 is connected, there being two tubes leading from the milker, one from each milk receptacle. These two tubes are connected to the opposite sides of the transverse center of a suitable pump such as C, by which air is drawn from one milk receptacle, while it is being forced into the opposite receptacle.

The apparatus is capable of providing milking means for two cows simultaneously, a set of four teat cups D being provided for each cow. Two of the teat cups of each set are connected such as by a flexible tube 20 to one milk receptacle such as 4, while the remaining two teat cups of said set are connected by a flexible tube 21 to the opposite milk receptacle, suitable valved connections 22 being mounted upon the upper end of each of the milk receptacles. As a result the pulsations of air resulting from the action of the pump C upon the milk receptacles simultaneously draws milk through one pair of the teat cups of each set into one milk receptacle, while the force of the air entering the opposite milk receptacle forces the milk from said last mentioned receptacle downwardly into the milk container A. My improved valve permits of this action, the one valve element 10 during the exhaust of air from one milk receptacle closing said receptacle tightly by its resiliency and by being drawn down tightly over the lower end thereof, while the opposite valve element is urged into open position by the force of the milk which is projected downwardly into the milk container A. The valve it will be noted closes by its resiliency and the suction action of the air in the milk receiving duct. This operation continues successively, one valve element closing while the other one is forced open. A resilient valve of the character described performs the function of quickly opening and closing, and can be easily and quickly removed when desired for cleaning or replacement of the parts. The double valve also being constructed from one piece of integral material is advantageous because there are a minimum number of joints and a less number of parts.

When desired a bridge such as 23 can be constructed across the lower end of each of the milk receptacles, so as to sustain the adjacent valve element from being drawn upwardly into the adjacent milk receptacle. The alternate drawing of air through first one set of teat cups and then the other approximates the natural manner of milking. When it is desired to clean those portions of the apparatus with which the milk comes into contact, the valve B can be removed and the caps 12 and all of the tubes detached from the apparatus. An apparatus of this character is less liable to get out of order than devices wherein metal valves are employed and the construction is simpler and less expensive.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:

1. In apparatus of the class set forth, a pulsator, comprising, in combination, a receptacle, a pair of coupling elements associated with said receptacle having milk receiving and air suction ports and downwardly and inwardly extending milk pocket ducts having openings at their lower ends facing together and spaced apart, and a valve having flexible flaps arranged to alternately close and open each of said openings.

2. In apparatus of the class set forth, a pulsator, comprising, in combination, a receptacle, a pair of coupling elements associated with said receptacle having milk receiving and air suction ports and downwardly and inwardly extending milk pocket ducts having openings at their lower ends facing together and spaced apart, and a valve having a yoke detachably engaged to the lower ends of said coupling elements and a pair of flexible flaps arranged to alternately close and open each of said openings.

3. In apparatus of the class set forth, a pulsator, comprising, in combination, a receptacle, a pair of coupling elements, associated with said receptacle having milk receiving and air suction ports and downwardly and inwardly extending milk pocket ducts having openings at their lower ends facing together and spaced apart, and a rubber valve having a body detachably mounted on the lower ends of said coupling element and flexible flaps arranged to alternately close and open each of said openings.

4. In apparatus of the class set forth, a pulsator, comprising, in combination, a receptacle, a pair of coupling elements, associated with said receptacle having milk receiving and air suction ports and downwardly and inwardly extending milk pocket ducts having openings at their lower ends facing together and spaced apart, and a valve having a body detachably mounted for limited lateral adjustment on the lower ends of said coupling elements and comprising flexible flaps arranged to alternately close and open each of said openings.

5. A milking apparatus, comprising, in combination, a milking receptacle, a pair of coupling elements mounted upon said receptacle having tubular milk pocket ducts adjacent their upper ends and terminating with their lower ends adjacent and spaced apart, a valve mounted upon said lower ends having adjacent flexible flaps over said lower ends and adapted through the alternate drawing of air upwardly through said ducts to close one of said ducts and assist in forming a trap therein for milk and open the other and permit milk therein emptying into said receptacle, milking and suction tubes connected with said coupling elements and means connected with said suction tubes adapted to produce a suction action first in one and then another of said milking tubes to actuate said valves.

6. In apparatus of the class set forth, a pulsator comprising, a receptacle having a milk outlet, coupling elements associated with said receptacle and a valve mounted upon said receptacle having a resilient flap urged into open position against its own spring return tendency by the pressure of the milk in said receptacle and closing automatically by its spring action.

7. In apparatus of the class set forth, a pulsator, comprising, milk receiving chambers having milk outlets, air and milk ducts associated with said receptacles and a resilient valve for closing said milk outlets alternately.

In testimony whereof, I have signed my name to this specification.

REUBEN B. DISBROW.